United States Patent
Kshetramade et al.

(10) Patent No.: US 8,775,355 B2
(45) Date of Patent: Jul. 8, 2014

(54) DYNAMIC ONLINE COMMUNITIES

(75) Inventors: Sanjay Kshetramade, Fremont, CA (US); Rajen Subba, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 417 days.

(21) Appl. No.: 12/973,813

(22) Filed: Dec. 20, 2010

(65) Prior Publication Data
US 2012/0158637 A1    Jun. 21, 2012

(51) Int. Cl.
*G06F 17/00* (2006.01)
*G06N 5/02* (2006.01)
*G06Q 50/00* (2012.01)
*G06Q 99/00* (2006.01)

(52) U.S. Cl.
CPC . *G06N 5/02* (2013.01); *G06Q 50/01* (2013.01)
USPC ............................. 706/50; 705/319

(58) Field of Classification Search
CPC ................................. G06N 5/02; G06Q 50/01
USPC ............................. 706/50; 705/319
See application file for complete search history.

(56) References Cited

U.S. PATENT DOCUMENTS

| | | | | |
|---|---|---|---|---|
| 8,601,055 | B2* | 12/2013 | Smith et al. | 709/204 |
| 2007/0204333 | A1* | 8/2007 | Lear et al. | 726/6 |
| 2007/0288602 | A1* | 12/2007 | Sundaresan | 709/219 |
| 2008/0005064 | A1* | 1/2008 | Sarukkai | 707/3 |
| 2008/0222295 | A1* | 9/2008 | Robinson et al. | 709/227 |
| 2009/0164624 | A1* | 6/2009 | Metcalf et al. | 709/224 |
| 2009/0254417 | A1* | 10/2009 | Beilby et al. | 705/10 |
| 2011/0060716 | A1* | 3/2011 | Forman et al. | 706/54 |

OTHER PUBLICATIONS

Gu, Weidong, and Wei Wei. "Automatic community discovery in peer-to-peer systems." Grid and Cooperative Computing Workshops, 2006. GCCW'06. Fifth International Conference on. IEEE, 2006.*

* cited by examiner

*Primary Examiner* — Alan Chen
*Assistant Examiner* — James F Sugent
(74) *Attorney, Agent, or Firm* — Martine Penilla Group, LLP

(57) ABSTRACT

Methods, systems, and computer programs for triggering interaction with a Dynamic Online Community (DOC) are presented. In one embodiment, a method includes an operation for monitoring online activity of a user, which includes tracking user input on a web browser. The method further includes operations for detecting that the user is interested in a subject based on the online activity, and for determining whether there is a DOC topic that is associated with the subject. The DOC has members that have shown an interest in the DOC topic. In another operation, the method assigns the user to be a member of the DOC if the determination indicates that there is a DOC topic associated with the subject. The user is automatically recommended to join the DOC. DOC related information is provided to the user after the user is assigned to the DOC. In one embodiment, the online activity of the user is searching in a search provider's website.

17 Claims, 8 Drawing Sheets

Fig. 4

DYNAMIC ONLINE COMMUNITIES

BACKGROUND

1. Field of the Invention

The present invention relates to methods for improving social interaction, and more particularly, methods, systems and computer programs for bringing together web users with common interests.

2. Description of the Related Art

Generally speaking, Internet online groups provide a communication tool for group members to exchange online group-related information. The online group is a tool which is a hybrid between an electronic mailing list and a threaded Internet forum. In other words, group messages can be read and posted by e-mail or on the group homepage. In addition, members can choose whether to receive individual, daily digest or special delivery e-mails, or simply read group posts on the group's web site. Groups can be created with public or member-only access. Some groups are simply announcement bulletin boards, to which only the group moderators can post, while other groups are discussion forums. One example of an Internet online group service is Yahoo! Groups™.

Typically, a moderator controls membership in the group. Users have to go through a sign-in process to become members of the group, and users continue membership in the group until the group disappears or the user opts to end membership. Users often have multiple interests at a given point in time, and many of these interests can be temporary, such as the soccer world cup, a family wedding, a personal problem, a health issue, etc. It is cumbersome for users to keep joining and separating from groups in order to gather useful online group information.

It is in this context that embodiments of the invention arise.

SUMMARY

Embodiments of the present invention provide methods, systems, and computer programs for triggering interaction with a Dynamic Online Community (DOC). The methods include operations for finding and building DOCs that cater to transient and long-term interests of users online (e.g., search sites, content sites, social media sites, etc.) DOCs reach out to the user rather than making the user find a community of interest, and DOCs simplify the way users follow or quit an online topical community. It should be appreciated that the present invention can be implemented in numerous ways, such as a process, an apparatus, a system, a device or a method on a computer readable medium. Several inventive embodiments of the present invention are described below.

In one embodiment, a method includes an operation for monitoring online activity of a user, which includes tracking user input on a web browser. The method further includes operations for detecting that the user is interested in a subject based on the online activity, and for determining whether there is a DOC topic that is associated with the subject. The DOC members have shown an interest in the DOC topic. In another operation, the method recommends the user to be a member of the DOC if the determination indicates that there is a DOC topic associated with the subject. DOC related information is provided to the user after the user accepts the recommendation to be a member of the DOC.

In another embodiment, a method includes operations for receiving from a user a search input in a search page of a search provider, and for detecting a subject of interest defined by the search input. Further, the method determines whether there is a DOC topic that is associated with the subject, the DOC having members that have shown an interest in the DOC topic. In another operation, the user is assigned to be a member of the DOC if the determination indicates that there is a DOC topic associated with the subject. The user is automatically assigned to the DOC without requiring an authorization of the user to join the DOC. The method includes an operation for providing DOC related information to the user in a search results page for the search input after the user is assigned to the DOC.

In yet another embodiment, a computer program embedded in a non-transitory computer-readable storage medium, when executed by one or more processors, for triggering interaction with a dynamic online community, includes program instructions for monitoring online activity of a user, the monitoring including tracking user input on a web browser. The computer program includes additional program instructions for detecting that the user is interested in a subject based on the online activity, and for determining whether there is a DOC topic that is associated with the subject. The DOC has members that have shown an interest in the DOC topic. The computer program further includes program instructions for recommending the user to be a member of the DOC if the determination indicates that there is a DOC topic associated with the subject. Other program instructions in the computer program provide DOC related information to the user after the user accepts the recommendation to be a member of the DOC.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 4 shows an embodiment of a search-results page with summary information regarding DOC membership.

DETAILED DESCRIPTION

The following embodiments describe a method and apparatus for triggering interaction with a DOC. It will be obvious, however, to one skilled in the art, that the present invention may be practiced without some or all of these specific details. In other instances, well known process operations have not been described in detail in order not to unnecessarily obscure the present invention.

At any time, there are a number of internet users with a common interest in some topic. These interests can be long term or transient. For example, when doing a web search, user's efforts to acquire knowledge occur in parallel and independently of other internet users. In the content area, social features allow different users to engage with one another, but mainly within the context of a specific site. This interaction on a specific site facilitates the formation of small cliques within the specific site only, but there is no information about other Internet pages that share the same topic. Embodiments presented herein dynamically provide an environment for collaboration and community formation, where users express their intentions or interests through various mediums, such as search, news, sports, online social activity, etc. In addition, knowledge regarding the topic of interest is built over time, allowing future members to benefit from the experience of others.

Figure 1:
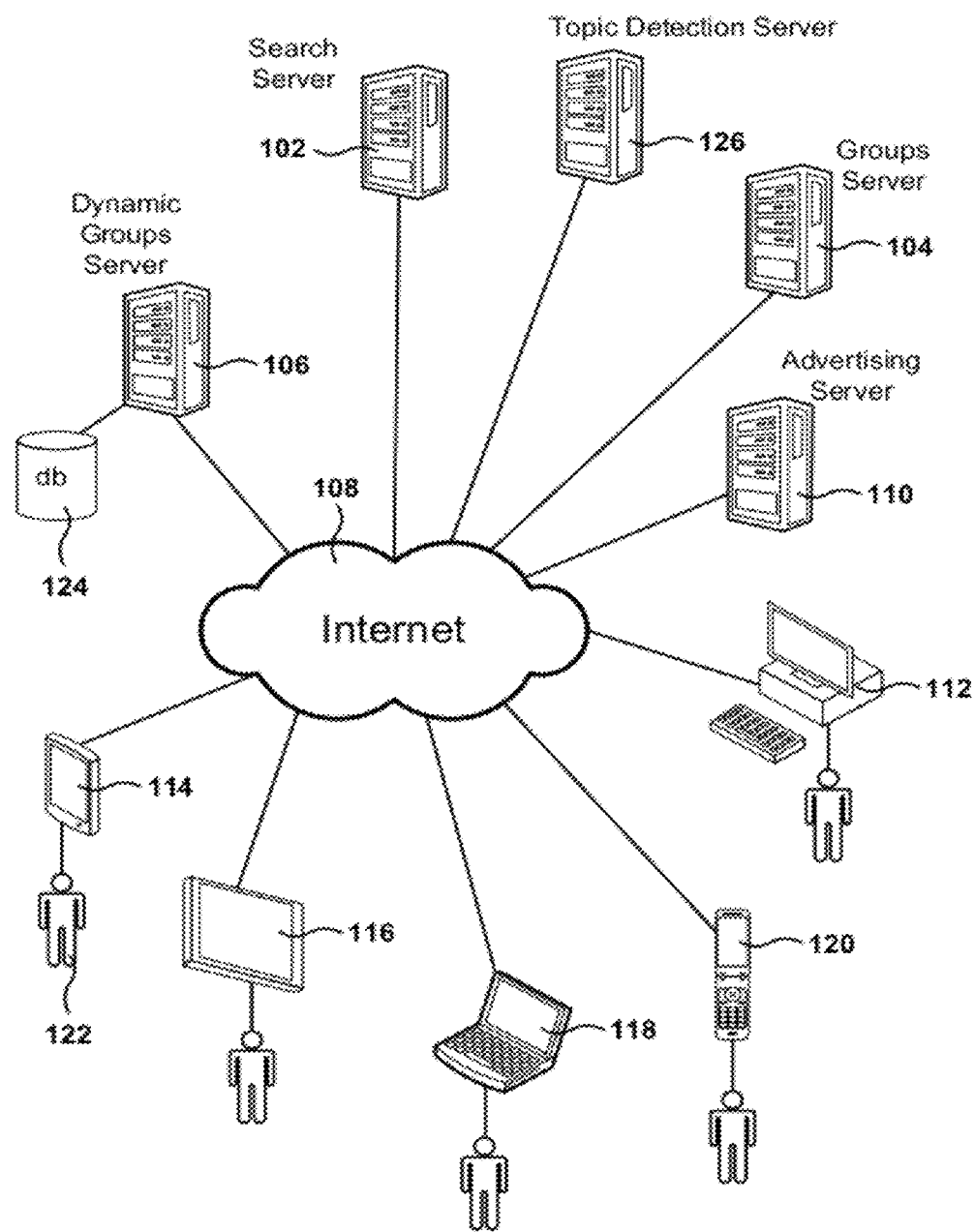
FIG. 1 is a simplified schematic diagram of a computer system for implementing embodiments of the present invention.

FIG. 1 is a simplified schematic diagram of a computer system for implementing embodiments of the present invention. Internet 108 is used to interconnect users with servers. Users 122 access Internet 108 via a variety of the devices, such as smart phone 114, tablet 116, laptop 118, mobile phone 120, personal computer 112, etc. These are merely examples, and any other device used to access Internet 108 can be used to implement embodiments of this invention. For example, the devices may be wired or wireless. In one embodiment, a browser is executed on a device, and the graphical user interface is presented on a display. The browser provides the functionality for accessing the Internet.

Search server 102, also known as a web search engine, provides search features to Internet users. A web search engine is designed to search for information on the World Wide Web. The search results are generally presented in a list of results and are sometimes called hits. The information may consist of web pages, news pages, blogs pages, images, etc. Unlike web directories, which are maintained by human editors, search engines operate algorithmically or are a mixture of algorithmic and human input.

Groups server 104 provides online group features to users. Internet online groups provide a communication tool for group members to exchange group-related information. The group information may include, emails, bulletin boards, photos, videos, files, etc. One example of an Internet online group service is Yahoo! Groups™. Dynamic groups server 106 deliver the DOC functionality presented herein to implement DOC for Internet users. Database 124 stores DOC related information, and more details on database 124 are presented below with reference to FIG. 6. Regular online groups, supported by groups server 104, and DOCs, supported by dynamic groups server 106, differ in that regular online groups are more rigidly defined than DOCs, because regular online groups require more effort by users and service providers to deliver the functionality, such as a moderator, a registration process, etc. The user must find the regular online group and then perform actions to join the regular online group. On the other hand, DOCs are dynamically created as the interests of the user are detected. The detection of the interest is enough to cause the join, or association, of the user with the DOC, the user benefiting immediately from the services offered by the DOC without having to register, be allowed access, etc.

Advertising server 110 provides ad delivery to Internet users from publishers, also referred to as advertisers. An Internet ad is a commercial message. Today there are already many established relationships between advertisers and content providers. For example, popular bloggers can make money from their blogs through advertisement placed in their blog pages. Advertisers are willing to pay content providers for attracting users to their websites, increasing brand name recognition, selling their products or services, etc. Topic detection server 126 monitors user's online activities and identifies new topics for DOCs.

Although different servers are described by way of example, the person skilled in the art will appreciate that multiple configurations are possible by combining several servers into one system, by having distributed systems where a single function can be accomplished by a plurality of different servers scattered across the Internet, or by caching information from the different databases at the different servers to accelerate the processing of information.

Figure 2:
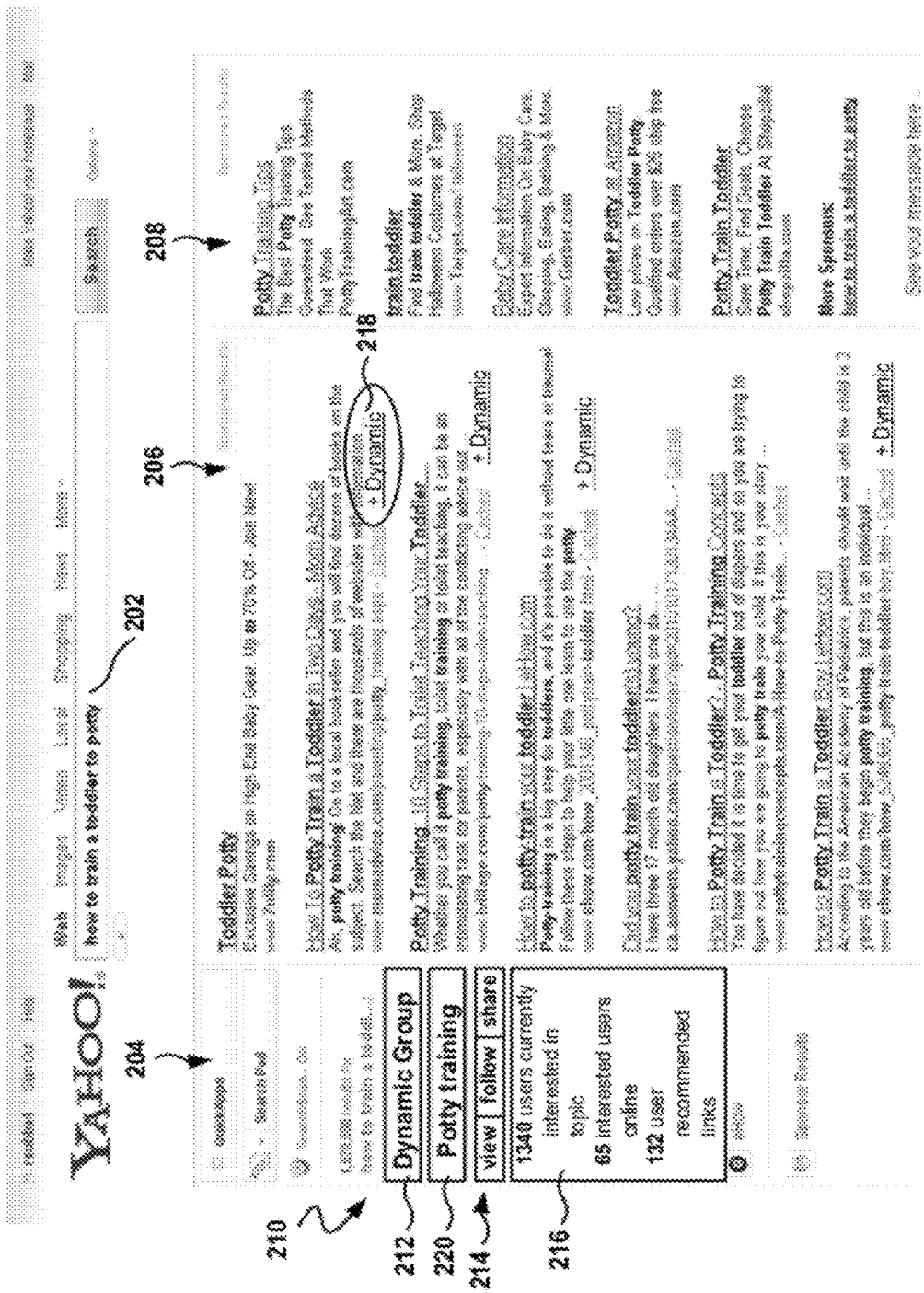
FIG. 2 shows a search results page that includes Dynamic Online Community (DOC) information, according to one embodiment.

FIG. 2 shows a search results-page that includes Dynamic Online Community (DOC) information, according to one embodiment. It should be noted that although some embodiments herein are described in reference to Internet search, the same principles can be applied in other areas, such as content sites, social networking, product pages, company pages, etc.

FIG. 2 presents a scenario where a mother wants to find out how to potty train her toddler. The mother access the search engine and submits the query "how to train a toddler to potty" 202. The search engine delivers the search results 206 in typical fashion with some additions. Along with the search results 206, the search engine presents DOC related information 210 on the tool area 204, left side of the page. On the right side of the page, advertising area 208 includes a list of advertisements, which are often related to the topic of the search.

Once the search query is entered, the search engine or the DOC engine analyzes the subject of the query. The system then checks whether the subject of the query matches a topic of an existing DOC, and if it is determined that a DOC exists with that topic, then the DOC related information 210 is displayed together with search results 206. The query analysis is done at a semantic level, that is, the search entered does not have to be exactly equal to the topic of the DOC, because the search is analyzed to find whether the search is related to a DOC topic, although the topic and the search request may not be exactly the same. In other words, several different searches can be associated with the same DOC topic, such as "how to train a toddler to potty," "potty training," "transition away from diapers," "toddlers in the bathroom," etc. This process is referred to as normalizing the search query to obtain a representative topic for the search query.

The mother receives a recommendation to join the DOC, and if the mother accepts the recommendation, then the mother can follow this particular community, on this particular topic, over time. In another embodiment, the mother is immediately associated with the DOC (i.e., joined with the DOC), so the mother is automatically assigned to the DOC without requiring an authorization of the mother to join the DOC. Once the toddler gets older, the mother will not be part of the DOC as the mother is no longer interested in this topic. When a user follows a topic, the user has the option of getting regular updates of what other users are adding to the knowledge repository in the DOC.

The DOC related information 210 includes a header 212 ("Dynamic Group,") a title 220 ("potty training,") an options area 214, and user related information 216. The options area 214 includes several links or buttons for the user to view DOC information, follow DOC activities (i.e., the user wants to actively follow the DOC), or share information or experiences that the user may have with the DOC. The user related information 216 includes information about the group. In the example of FIG. 2, the DOC information includes the number of users currently interested in the topic, the number of users interested in the topic that are currently online, and the number of user recommended links (websites) with DOC information.

Following a DOC provides a nexus for all users that share the same interest in a topic. Further, users are updated about the topic of interest, reducing the amount of effort required to cull and curate large volumes of documents and information to identify the most useful documents. Also, consumption of the updates on the virtual community page increases the amount of user engagement in the topic of interest beyond the initial interaction. Updates to the DOC pages incentivize users to continually interact with the community, thus allowing the DOC service provider to benefit from the increased amount of traffic.

In one embodiment, DOC information affects the search results. For example, search results can be prioritized using DOC curated information (i.e., information that has been reviewed and rated by a plurality of DOC members). For example, if a topic has a large amount of traffic, a prominent link or tag is added in the results pointing to a DOC webpage.

It should be noted that the embodiments illustrated in FIG. 2 are exemplary. Other embodiments may utilize different fields, locate fields in different parts of the page, or provide different types of information. The embodiments illustrated in FIG. 2 should therefore not be interpreted to be exclusive or limiting, but rather exemplary or illustrative.

Today, users may get search results from existing interest groups, but each user needs to go through different interest groups, news, blogs, etc., to see if there is something useful to the user. Instead, in a dynamic online community, the knowledge is formed dynamically. The DOC keeps track of the users interested in the topic and keeps this information in a database. When a user indicates that the user is no longer interested in the DOC, then the user is withdrawn from the group. In one embodiment, a period of inactivity of the user within the DOC is measured, and when the period of inactivity reaches a threshold, then the user is also withdrawn from the DOC. This way, the user does not have to actively sign in or sign out to enter or leave the DOC.

When a user ends membership in a DOC, the annotations, comments, ratings, contributions, etc., that the user added to the DOC remain in the database associated with the DOC, as part of the knowledge acquired by the DOC. If the user later rejoins the DOC, all the previous history from the user is recovered, unless of course, the user expressly deletes all or some of the user's contributions.

Searches can be categorized as head queries and long-tail queries. The head queries originate large amounts of user searches, and the long-tail queries present a low volume of user searches. For example "world cup" is a head query because, especially during the world cup, there are many users searching information on this topic. DOCs for head queries provide the user with more information on the topic of interest.

Long tail refers to low volume searches, i.e., at a given time there are only a few of users interested in the topic. For example, a user may be looking for a rare book, an antique, an old low-budget movie, etc. It is hard to find relevant documents in a long tail topic. A way to help the user is to find other users that may over time have an interest in following the same topic. Even though there may not be anyone interested in the topic at the time of the search, maybe over the next day or week, there can be 10, 30, 40 more people that are interested in the same topic. By creating a DOC for this topic, the small community of users can naturally come together in one place.

Communities are created dynamically based on the user interest at a point in time. The goal is to bring users searching for the same topic together, to allow them to collaborate. Dynamic groups are usually open. In one embodiment, DOCs can also be refined according to geography, user sex, age, or some other form of demographic. For example, a DOC group related to "used car sales" may be divided in multiple DOCs according to specific geographic areas. In addition, the "used car sales" DOC is one example of how DOCs can be created around a market activity, to bring sellers and users together and create dynamic marketplaces. In one embodiment, users are separated in categories (e.g., buyers and sellers) to further define how each user is interested in the DOC topic, and to enable other users to better understand the point of view or bias of other users in the DOC.

Figure 3:
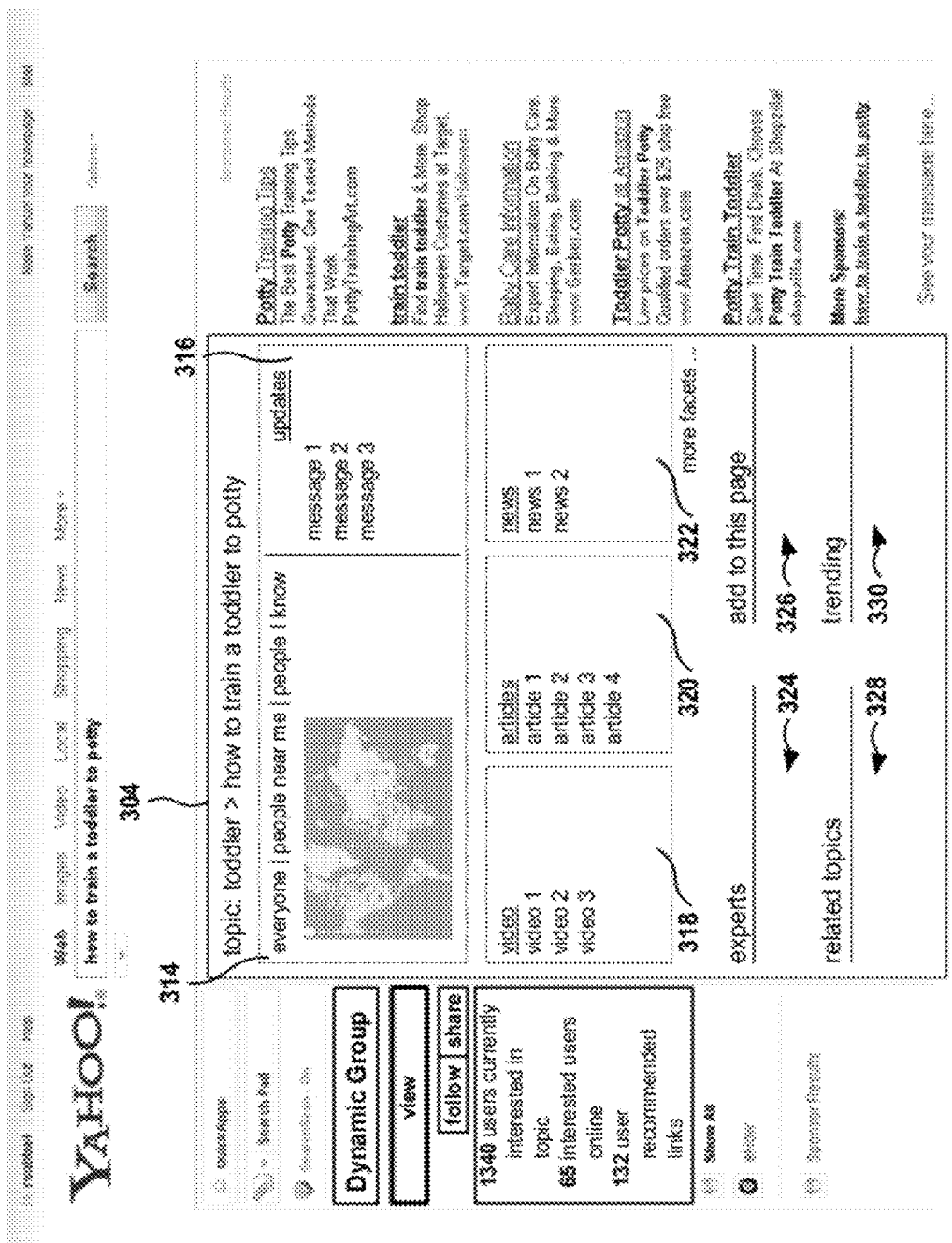
FIG. 3 shows a web page including DOC related information, according to one embodiment.

FIG. 3 shows a web page that includes DOC related information, according to one embodiment. When a user clicks on the dynamic tag 218 of FIG. 2, or in some other button on DOC related information 210, the user is presented with a DOC webpage, such as the DOC page shown in FIG. 2. DOC information section 304 includes multiple areas with information regarding the topic of interest.

The DOC includes a list of documents that users have curated by rating contents, adding comments, voting, etc. The dynamic community selects which are the most relevant documents. There can be a discussion board, for the exchange of information. Also, included is a list of related topics (e.g. other toddler/baby related topics, language, teeth, tantrums, etc.), which can be linked to other related dynamic groups. The DOC curated documents can be of different types, such as videos 318, or articles 320, etc. Additionally, other sections such as news 322 may or may not be ranked by users. For example, the news presented may be current news obtained when using the DOC topic in a news search engine.

Videos 318 and articles 320 include links to other web pages with related information. In one embodiment, the information presented in the DOC only refers to information found in other web pages. In another embodiment, users can add content to the DOC page that would be listed in the DOC and would not be available anywhere else. For example, if the user finds links of interest for the DOC topic that are not already in the DOC database, the user can add and comment on these new links of interest for the DOC. In yet another embodiment, a list of users currently following the same topic is presented in the DOC site, except for those users that select to be anonymous or that do not have an id (identifier) within the system (e.g. a Yahoo! account). User area 314 provides different options for viewing other users, such as everyone, people in the geographic location of the user ("people near me"), friends in a social network of the user ("people I know"), etc. In the embodiment of FIG. 3, a map is also provided to enable the user to select a geographic location on the map via graphical user interface.

Tools to annotate documents by the users are also available. The annotations can be made via links associated with a particular page or document, or can be done as additions to the page itself, such as messages area 316 and addition area 326 ("add to this page"). The user has options to make additions to the page, which can be adding a link to a new resource, adding a new resource, a piece of news, comments on other documents, ratings of documents, bulletin boards for posting questions, etc. A special area is reserved for experts 324 in the field, which can provide in-depth commentary on the topic.

A related topics 328 area provides links to related topics, which includes other related DOCs (e.g., day care, early learning tools, doctors, etc.), and another area presents information regarding recent trends 330 ("trending"), including, but not limited to, what are the most-popular related DOCs.

By providing a mechanism for the system to gather and build knowledge over time as a result of the interaction between system and users, search can become, not only a platform to serve knowledge, but also an engine to acquire knowledge. In one embodiment, the search results from the search engine are prioritized using DOC related information.

DOCs provide advertisers an opportunity to target users interested in the topic, users that are not only casually interested but also engaged with a given topic during a given time window, thus making promotional activities more specific and with higher response rates. Additionally, advertisers may place ads to the user when the user is not engaged within the DOC group, but doing other activities. For example, a user reading email may see ads on the page that relates to the DOC.

As users curate and annotate information, knowledge is built and expanded for the DOC. This is different from a search engine, where the search service may identify what are the most popular pages, because a typical search engine does not keep track of comments from users on the value of the search results, nor on additional knowledge that a user may contribute.

In one embodiment, the DOC saves the search history of a user when the user is performing searches on the topic associated with the DOC, including those searches performed using any search engine, independently of whether the user is performing the search while accessing the DOC site or not.

Figure 4:
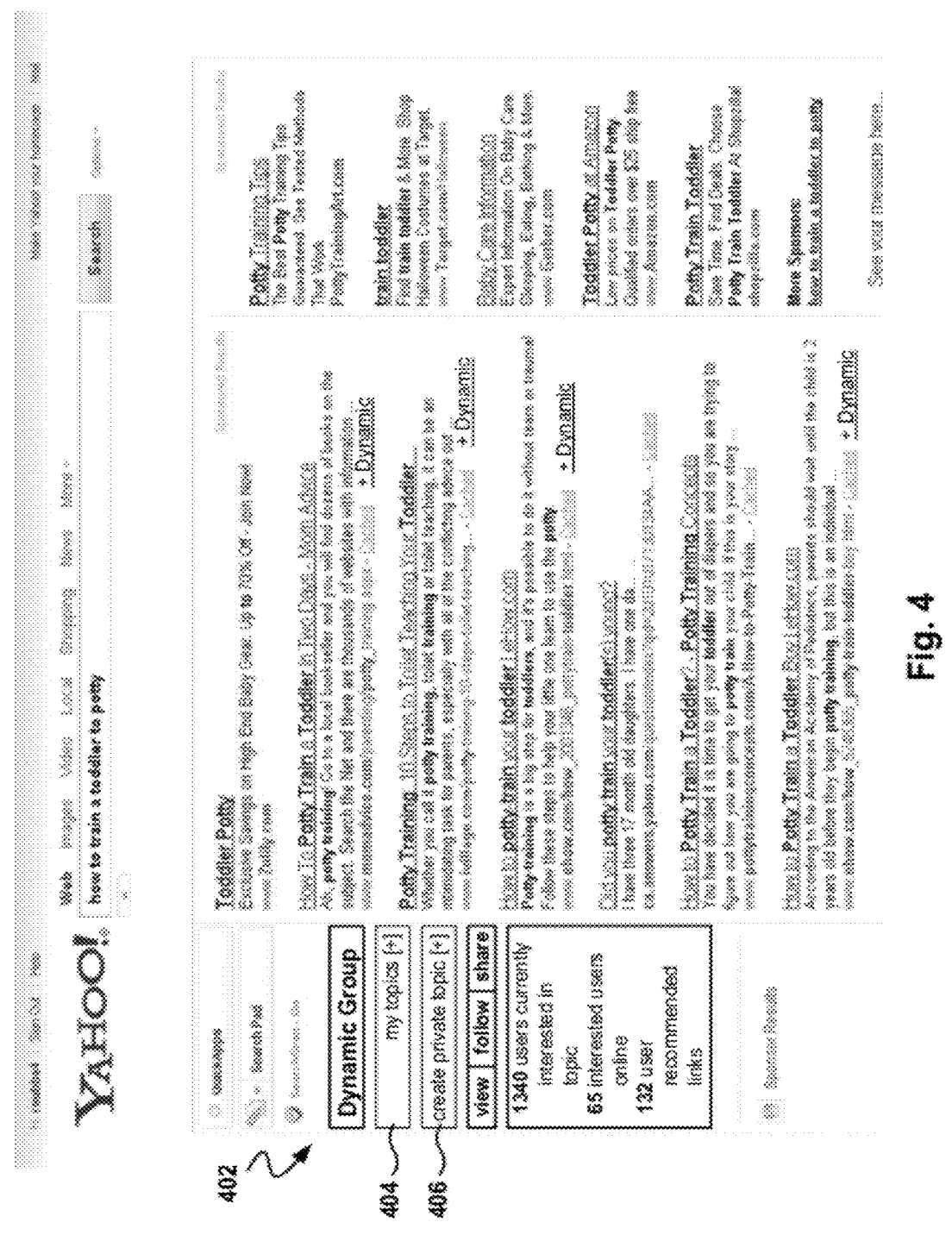

FIG. 4 shows an embodiment of a search-results page with summary information regarding DOC membership. After a user enters a search request, DOC information 402 is presented on the results page. In one embodiment, the DOC information includes a link to list all the DOC groups 404 where the user is currently engaged ("my topics"). Additionally, a link to create a private topic 406 is provided ("create private topic.") The private topic allows the user to create a dynamic community with controlled membership. For example, the user may create a DOC for a school team project, for a soccer team, etc. A key to the private DOC is maintained by the system to allow other users to follow the topic. The key could include the user id of the creator, a password, or some other form of identification.

Once the user follows one of the results from the search page (or follows a link from the DOC page), the user has the option to provide feedback on that document. To do so, the user goes back to the DOC pages and adds a comment or rating to the document. If the user makes his web history available, the DOC system can also ask the user to rate some of the pages that the user has visited.

In another embodiment, the external sites may be linked to the DOC service by the use of an external application programming interface (API). The external site provides a link in the page to the DOC, such that the user can click on the link and then being presented with a method to rate the content on the page. One example of such service is Yahoo! Application Platform, which provides a centralized distribution point for applications to Yahoo! users.

In wiki sites, knowledge is built over time, but the process is cumbersome and authorship is limited to a very small segment of users. Users need to login to the system, learn the process for submittals and review by peers, get approval from a moderator, etc. In DOCs, users are joined to the system without requiring an explicit authorization from the user to join the DOC. Everyone can enter updates on the system and benefit from the knowledge built by other users. Additionally, wikis tend to be closed systems, where the information is kept by a central authority, typically a single website. However, DOCs allow users to easily comment on documents in any website and to enter information from their own experience. Additionally, users in wiki do not only interact with other users beyond the user of static boards, for example a typical wiki does not provide chat capabilities.

Blogs provide a different type of user interaction from DOCs. In blogs, when a user is interested in a topic, the user must find the right blog and then search through all the postings until the right information is found. Sometimes, users are required to join the blog before obtaining the information. It takes a lot of user effort to sort through all the blog information before finding the right answer. Also, blogs can have low traffic and little useful information. DOCs, unlike blogs, provide a fast way for the user to obtain community knowledge, and the information presented is not just what bloggers have entered, but the information in DOCs refers to many different sites and documents that the users have rated or curated over time.

Figure 5:
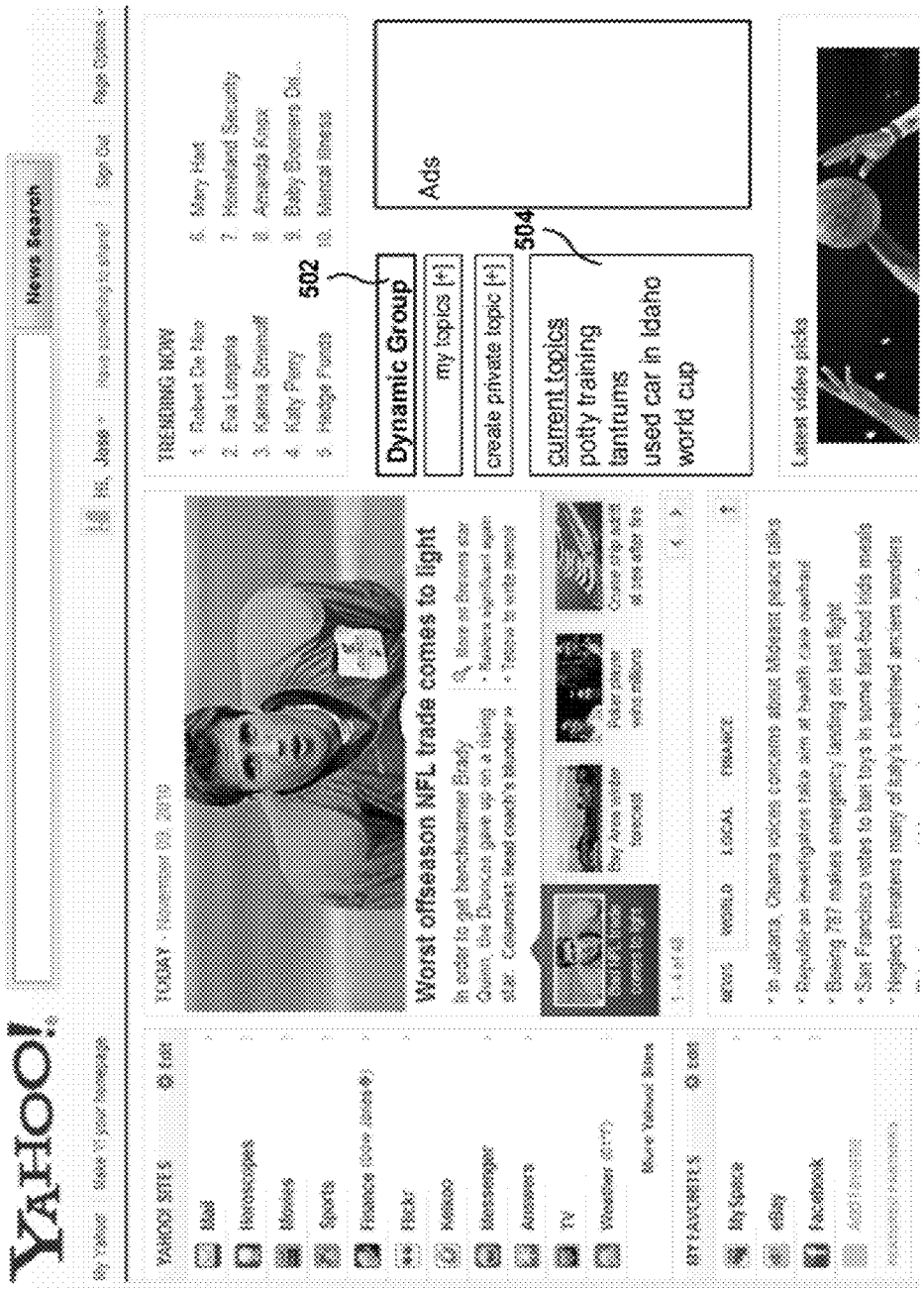
FIG. 5 shows a news webpage that includes DOC related information, according to one embodiment.

FIG. 5 shows a news webpage that includes DOC related information, according to one embodiment. Dynamic online communities can be linked to search results or related to some other external content sites. For example, the user may be presented with DOC information when the user performs a search in a news site, a financial site, etc., or when the user follows a link to a page in a certain topic (e.g. a political candidate).

FIG. 5 shows DOC information 502 presented in a news page. Dynamic group area 502 is placed on the right of the page. A list of the current topics (or DOCs) for the user is provided. In another embodiment, a directory of dynamic online communities is presented to the user that wants to browse topics of interest.

Dynamic online groups address the needs of the long tail, i.e., rare topics. For example, an antique collector may be having difficulty finding enough relevant information for a certain item, or finding a community for interaction and knowledge sharing. The collector submits a query for a rare antique item, discovers that the search results are not satisfactory, and finds that no one is currently following the same rare topic. The collector decides that she wants to connect with other fellow collectors and clicks on a link to create the empty new community. A few hours later the collector receives an update from another user with the same interest and a day later 40 more users have joined the DOC. The users start sharing their knowledge, discuss their interests in the antique item, and start building a community for this long tail topic.

It should be noted that the embodiments illustrated in FIGS. 2-5 are exemplary embodiments for implementation of DOCs. Other embodiments may utilize different layouts or present different buttons and fields. The embodiments illustrated herein should therefore not be interpreted to be exclusive or limiting, but rather exemplary or illustrative.

Figure 6:
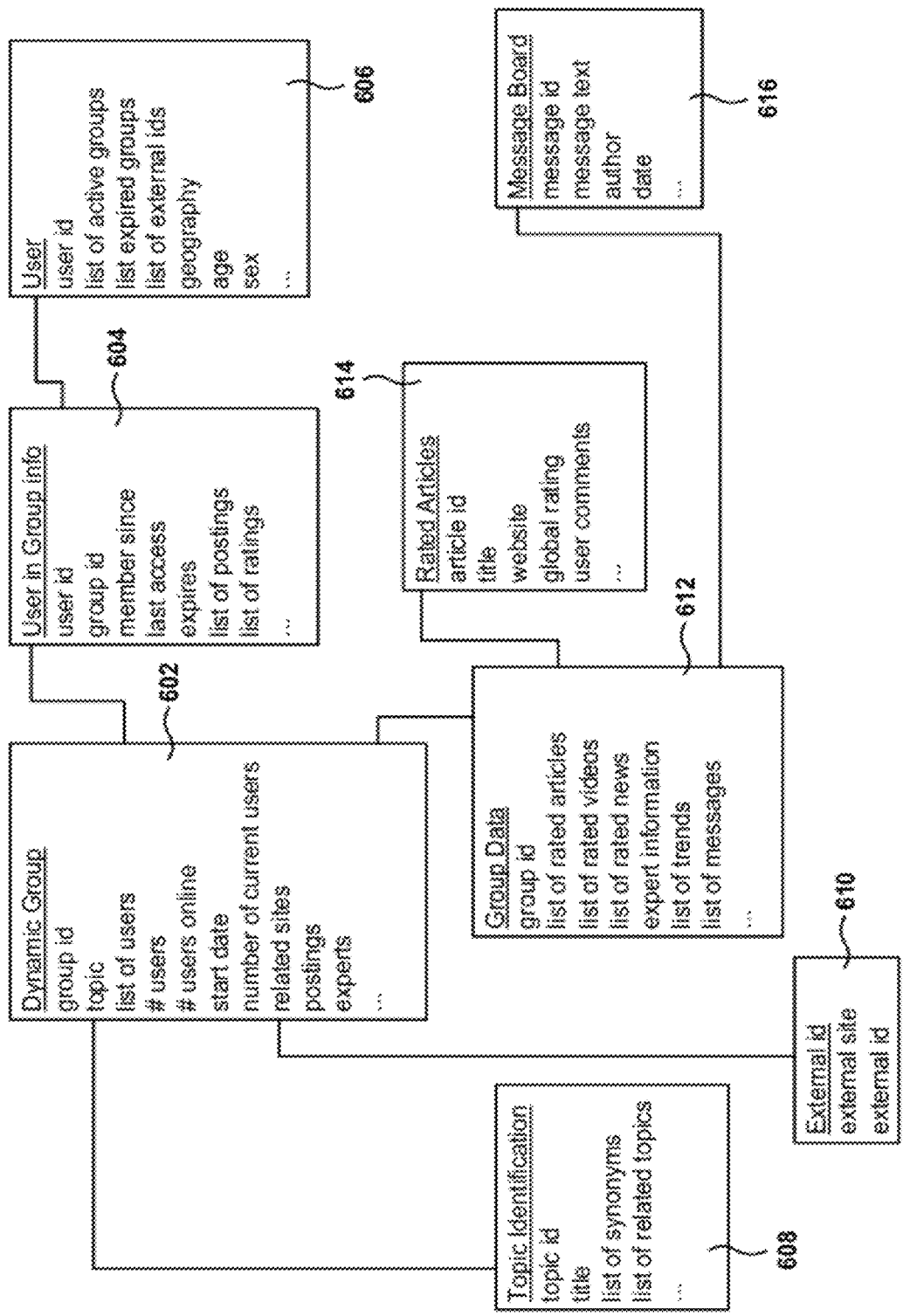
FIG. 6 illustrates an embodiment of the structure of a database storing DOC information.

FIG. 6 illustrates an embodiment of the structure of a database storing DOC information. The dynamic community server (DCS) keeps tracks of users, topics, ratings, messages, metadata, etc., which is stored in a database. The database includes a plurality of tables, with some links joining some of the tables. It should be noted that the database illustrated in FIG. 6 is exemplary. Other embodiments may utilize different data structures and store other types of information. Further, the data structure in FIG. 6 is not intended to be exhaustive, but rather provide the definition of some tables in the database. The embodiments illustrated in FIG. 6 should therefore not be interpreted to be exclusive or limiting, but rather exemplary or illustrative.

Dynamic Group table 602 keeps one entry for each DOC. The table includes information such as group id, topic of the DOC, list of user members, number of users, number of current users online, related sites, postings, etc. The topic information is stored in Topic Identification table 608, which contains the topic id, the standard-topic title, a list of synonyms, a list of related topics, etc. The external site information of Dynamic Group table 602 is stored in External Id table 610, which contains entries for each external site and id (name.) The information about users in the group is stored in User in Group Info table 604. This table includes, for each user member, the id of the user, the id of the group (DOC), the date when the user joined the DOC, the date of the last access to the DOC by the user, membership expiration date (if user inactive), list of postings by the user, list of ratings, etc.

User information is kept in User table 606, which, in one embodiment, is shared with or contains information from other internet services, such as a search engine. The User table 606 contains the user id, a list of active groups for the user, a list of expired groups, a list of external ids (login ids of this user in other websites), geography, age, etc.

DOC content information is stored in Group Data table 612 and associated tables. Group Data includes the group id, list of rated articles, list of rated videos, list of rated news, expert information, list of trends, list of messages, etc. Article related information is stored in the Rated Articles table 614, which includes the article id, a title for the article, the website where the article resides, a global rating of the article, user comments, etc. Message Board table 616 includes the messages from the message board in the DOC, and it includes a message id for each message, message text, author, date, etc.

Figure 7:
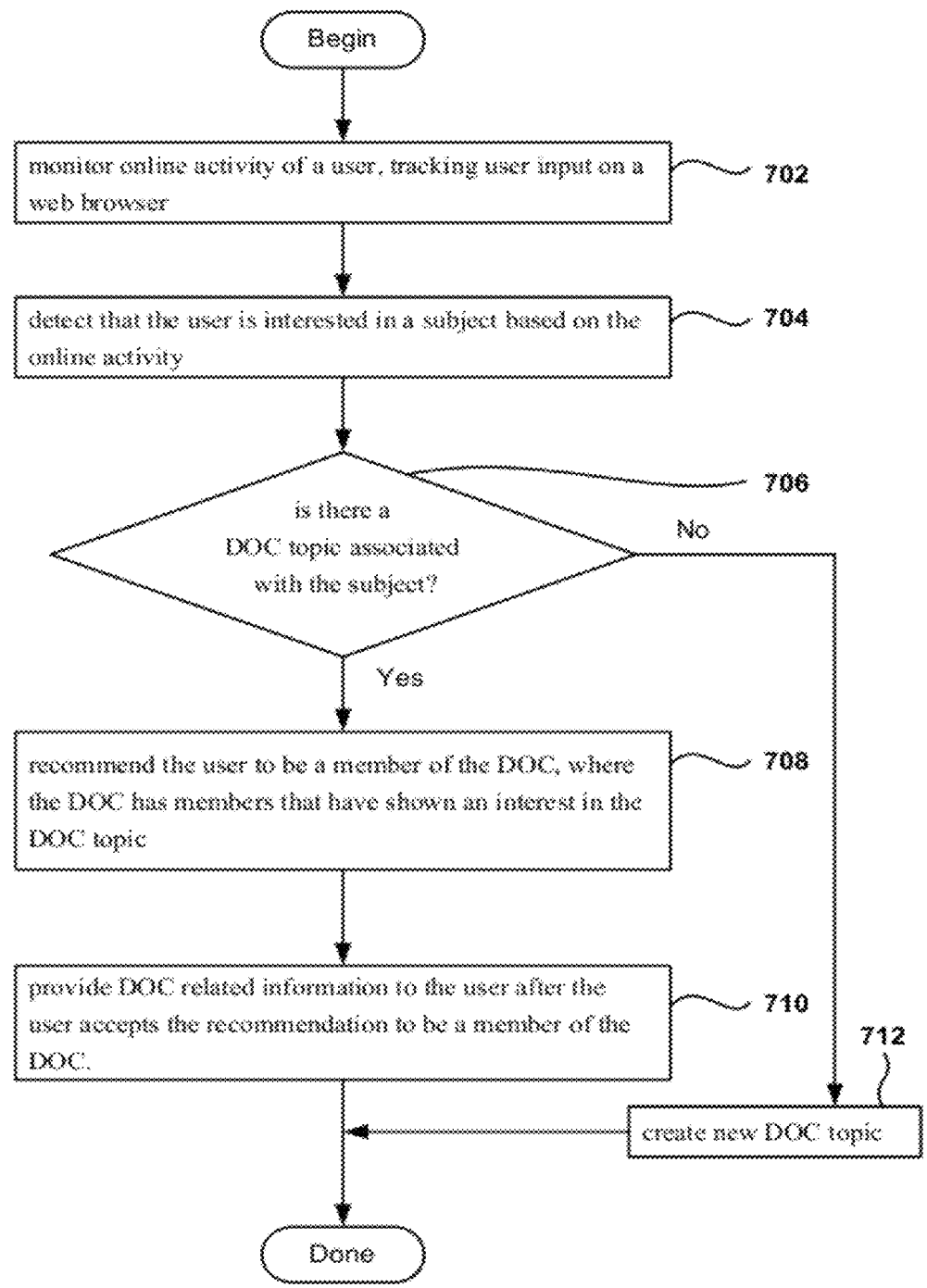
FIG. 7 shows the process flow for triggering interaction with a DOC in accordance with one embodiment of the invention.

FIG. 7 shows the process flow for triggering interaction with a DOC in accordance with one embodiment of the invention. In operation 702, the method monitors the online activity of the user by tracking the user input on a web browser. In one embodiment, the user input is a keyword input or a mouse click on the web page, or a combination of both. After operation 702, the method flows to operation 704, where the method detects if the user is interested in a subject by analyzing the online activity of the user, which can include search queries, pages visited by the user, content of web pages visited by the user, etc.

Operation 706 determines whether a DOC topic is associated with the subject detected in operation 704. If the association is detected, the method flows to operation 708, and if the association is not detected, the method flows to operation 712. In operation 708, the user is assigned to be a member of the DOC. The user is recommended to be a member of the DOC, which has members that have shown an interest in the DOC topic. After operation 708, the method flows to operation 710, where DOC related information is provided to the user accepts the recommendation to be a member of the DOC. In operation 712, a new DOC topic is created when it is determined that there is no DOC topic associated with the subject.

Figure 8:
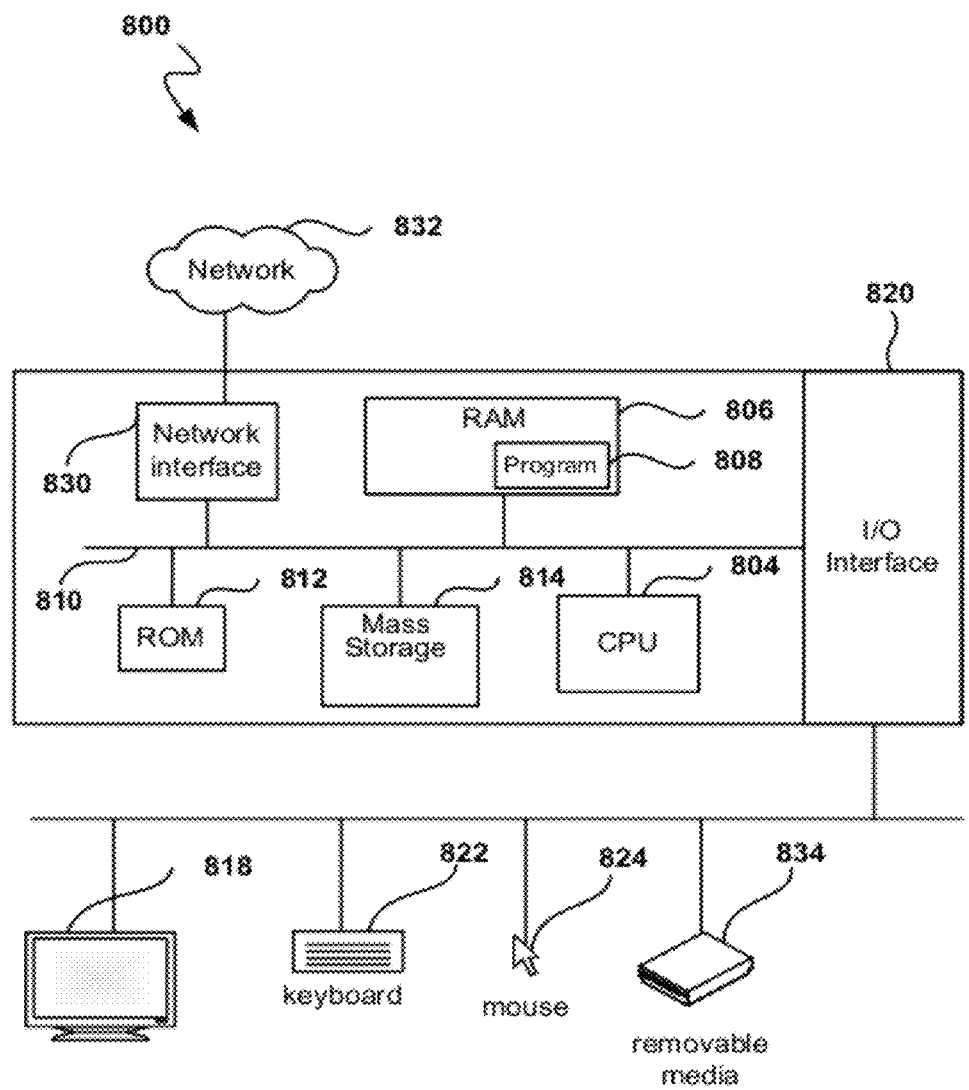
FIG. 8 is a simplified schematic diagram of a computer system for implementing embodiments of the present invention.

FIG. 8 is a simplified schematic diagram of a computer system for implementing embodiments of the present invention. FIG. 8 depicts an exemplary computer environment for implementing embodiments of the invention. It should be appreciated that the methods described herein may be performed with a digital processing system, such as a conventional, general-purpose computer system. Special purpose computers, which are designed or programmed to perform only one function, may be used in the alternative. The computer system includes a central processing unit (CPU) 804, which is coupled through bus 810 to random access memory (RAM) 806, read-only memory (ROM) 812, and mass storage device 814. DOC computer program 808 resides in random access memory (RAM) 806, but can also reside in mass storage 814.

Mass storage device 814 represents a persistent data storage device such as a floppy disc drive or a fixed disc drive, which may be local or remote. Network interface 830 provides connections via network 832, allowing communications with other devices. It should be appreciated that CPU 804 may be embodied in a general-purpose processor, a special purpose processor, or a specially programmed logic device. Input/Output (I/O) interface provides communication with different peripherals and is connected with CPU 804, RAM 806, ROM 812, and mass storage device 814, through bus 810. Sample peripherals include display 818, keyboard 822, cursor control 824, removable media device 834, etc.

Display 818 is configured to display the user interfaces described herein, such as the web pages shown in FIGS. 2-5. Keyboard 822, cursor control 824, removable media device 834, and other peripherals are coupled to I/O interface 820 in order to communicate information in command selections to CPU 804. It should be appreciated that data to and from external devices may be communicated through I/O interface 820. The invention can also be practiced in distributed computing environments where tasks are performed by remote processing devices that are linked through a wire-based or wireless network.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for triggering interaction with a dynamic online community (DOC), the method comprising:
   detecting a search query entered by a user in a search website;
   identifying a subject of the search query;
   determining whether there is a DOC for a topic that is associated with the subject of the search query;
   if there is a DOC then:
      presenting search results and DOC related information in response to the search query, wherein the DOC related information is presented even if the user is not a member of the DOC;
      recommending the user to become a member of the DOC; and
      adding the user as a member of the DOC without having to register the user in the DOC when the user accepts the recommendation; and
   if there is not a DOC then dynamically creating a new DOC without requiring user initiation to create the DOC when a plurality of users have performed search queries for the topic, wherein operations of the method are executed by a processor.

2. The method as recited in claim 1, further including:
   detecting a user request associated with the DOC related information; and
   displaying DOC related information in a DOC webpage.

3. The method as recited in claim 2, wherein the DOC related information includes curated rated content by the members of the DOC.

4. The method as recited in claim 1, wherein determining whether there is a DOC further includes:
   normalizing the search query to determine whether the normalized search query is equal to any DOC topic, wherein normalizing includes selecting a representative normalized subject for a plurality of subjects that are substantially equal in meaning.

5. The method as recited in claim 1, wherein the DOC topic is related to a category selected from a group consisting of health, finance, family, news, and dating.

6. The method as recited in claim 1, wherein the DOC topic is related to buying and selling products or services, the DOC bringing together buyers and sellers.

7. A method for triggering interaction with a dynamic online community (DOC), the method comprising:
   receiving from a user a search query in a search page of a search provider;
   detecting a subject defined by the search query;
   determining whether there is a DOC for a topic that is associated with the subject, wherein the user is not a member of the DOC;
   if there is a DOC then:
      assigning the user to be a member of the DOC, wherein the user is automatically assigned to the DOC without requiring an authorization of the user to join the DOC and without having to register the user in the DOC; and
      providing DOC related information to the user in a search results page for the search query; and
   if there is not a DOC then dynamically creating a new DOC without requiring user initiation to create the DOC when a plurality of users have performed search queries for the topic, wherein operations of the method are executed by a processor.

8. The method as recited in claim 7, wherein the search results in the search results page are prioritized based on ratings of web pages by members of the DOC.

9. The method as recited in claim 7, wherein the DOC related information includes one or more of number of members in the DOC, links to webpages rated by the members, tags embedded within search results, expert information, news, related topics, message board, and trends.

10. The method as recited in claim 7, further including:
    providing an option for the user to withdraw from the DOC.

11. The method as recited in claim 7, further including:
    monitoring user activity within the DOC; and
    withdrawing the user from the DOC after a period of inactivity within the DOC.

12. The method as recited in claim 7, wherein advertisers place advertisements related to the DOC topic when the DOC related information is presented to DOC members.

13. The method as recited in claim 7, further including:
    providing information to the user regarding DOCs that are currently associated with the user.

14. A computer program embedded in a non-transitory computer-readable storage medium, when executed by one or more processors, for triggering interaction with a dynamic online community (DOC), the computer program comprising:
    program instructions for monitoring pages visited by a user while accessing a web browser;
    program instructions for detecting that the user is interested in a subject based on the pages visited by the user in the web browser;
    program instructions for determining whether there is a DOC for a topic that is associated with the subject;
    if there is a DOC then:
       program instructions for presenting DOC related information, wherein the DOC related information is presented even if the user is not a member of the DOC;
       program instructions for recommending the user to become a member of the DOC;
       program instructions for adding the user as a member of the DOC without having to register the user in the DOC when the user accepts the recommendation; and
    if there is not a DOC then dynamically creating a new DOC without requiring user initiation to create the DOC when a plurality of users have visited pages associated with the topic.

15. The computer program as recited in claim 14, wherein DOC related information is stored in a database, the database including information about members, curated documents, news, experts, and related topics.

16. The computer program as recited in claim 14, wherein the DOC related information includes information available exclusively to members of the DOC.

17. The computer program as recited in claim 14, wherein the computer program further includes:
   program instructions for providing an application user interface (API), the API allowing integration of DOC related information in websites external to the DOC.

* * * * *